United States Patent [19]

Holden

[11] Patent Number: 4,633,039

[45] Date of Patent: Dec. 30, 1986

[54] MASTER-SLAVE MICROPROCESSOR CONTROL CIRCUIT

[75] Inventor: James R. Holden, Chicago, Ill.

[73] Assignee: GTE Communication Systems Corp., Northlake, Ill.

[21] Appl. No.: 599,122

[22] Filed: Apr. 11, 1984

Related U.S. Application Data

[63] Continuation of Ser. No. 220,935, Dec. 29, 1980, abandoned.

[51] Int. Cl.[4] .............................................. H04Q 9/00
[52] U.S. Cl. ..................................... 379/32; 379/269; 379/279
[58] Field of Search ....................... 364/200, 900, 300; 179/18 ES, 18 EE

[56] References Cited

U.S. PATENT DOCUMENTS

| | | | |
|---|---|---|---|
| 3,517,171 | 6/1970 | Avizienis | 364/200 |
| 3,820,085 | 6/1974 | Zelinski | 179/18 EE |
| 3,838,261 | 9/1974 | Rice et al. | 179/18 EE |
| 3,845,425 | 10/1974 | Clements et al. | 364/200 |
| 3,916,384 | 10/1975 | Fleming et al. | 364/200 |
| 3,980,839 | 9/1976 | Hutcheson | 364/900 |
| 4,017,840 | 4/1977 | Schild et al. | 364/200 |

OTHER PUBLICATIONS

"Fault-Tolerant Design of Local ESS Processors", W. N. Toy Proceedings of the IEEE, vol. 66, No. 10, Oct. 1978, pp. 1126–1145.

*Primary Examiner*—Gareth D. Shaw
*Assistant Examiner*—John G. Mills
*Attorney, Agent, or Firm*—Gregory G. Hendricks

[57] ABSTRACT

A control circuit, for use in a telephone switching system, which monitors, controls and transfers data to and from memory, input-output devices and external circuits. A pair of microprocessors and associated read-only and random-access memories are operated in a master-slave arrangement. A comparison circuit continuously monitors the integrity of the master microprocessor by comparing the signal on its data, address and control leads with those of a slave microprocessor.

15 Claims, 13 Drawing Figures

MASTER-SLAVE MICROPROCESSOR CONTROL CIRCUIT

This application is a continuation of my application Ser. No. 220,935 filed on Dec. 29, 1980, now abandoned.

CROSS REFERENCE TO RELATED APPLICATION

Co-pending and concurrently filed U.S. patent application, Ser. No. 220,934, titled "Microprocessor Control Circuit" now U.S. Pat. No. 4,412,282, is related to the present application. The inventions claimed in both of these applications were invented by the same inventor and assigned to the same assignee or its successor in interest.

BACKGROUND OF THE INVENTION (1) Field of the Invention

The present invention relates to telephone switching systems and more particularly to a microprocessor circuit for control of such systems.

(2) Description of the Prior Art

Microprocessor control circuits have become well known since the development of microprocessors. Most of these circuits are used in a simplex arrangement to perform control and data transfer functions in a more efficient and flexible manner than the logic circuits they replace.

Telephone systems however require a high degree of reliability which typically results in the use of duplex microprocessors (first and second parties) monitored by a third party circuit which detects a faulty microprocessor and configures it off line. However, such an arrangement requires not only the use of a complex third party circuit but also requires diagnostic software to routine each microprocessor and the third party circuit.

Accordingly, it is the object of the present invention to provide a highly reliable microprocessor control circuit for use in a telephone switching system without the need for a third party circuit and extensive diagnostic software.

SUMMARY OF THE INVENTION

The present invention is a microprocessor control circuit which provides the high reliability required in telephone switching systems through use of a master-slave arrangement of microprocessors. Each microprocessor works with an associated read-only memory and random-access memory. Each microprocessor also works through an associated bus transceiver circuit. However, the transceiver associated with the slave microprocessor allows only transfers of data to the microprocessor, while the bus associated with the master microprocessor allows it to both receive data from and transfer data to the data bus.

Each microprocessor operates synchronously at a maximum clock frequency of 8 MHZ. The address, data and the control leads of each microprocessor are matched for each memory and input/output (I/O) bus transfer cycle. This matching provides for continuous monitoring of the integrity of the microprocessor pair. The necessity for extensive microprocessor diagnostic programs is eliminated in such an arrangement since both the master and slave microprocessor are configured off-line by the remainder of the telephone switching system upon detection of a mismatch.

External circuitry responds to this failure condition by configuring both the master and slave microprocessors off line. Thus the duplication at the master-slave level is only used for detection of faults as indicated by master and slave microprocessor miscomparisons. The master-slave arrangement is then duplicated at a higher level to allow continuity of processing when a faulty master-slave pair is placed off line. Thus, software need only configure the faulty master-slave pair off line since fault detection is made by hardware at the master-slave level.

Each microprocessor is connected to three separate buses. The address bus is a 21 bit latched bus, the data bus consists of a 16 bit bidirectional data path and the control bus provides for transfer of memory and I/O access signals. A mismatch during any of these bus cycles causes the failed condition to be latched and an external indication is provided via a processor failure lead.

The slave microprocessor can only receive data from the data bus i.e. it is not allowed to place any data on the system bus and thus it only provides a matching function. A mismatch of any of the control leads during any bus cycle also causes the failed condition to be latched and an external indication is again provided via the processor failure output lead.

Each microprocessor is associated with a read only memory. This memory contains the "cold start" boot strap programs and diagnostic routines for self check exercising of the microprocessor. The duplicated memories are addressed independently by the two microprocessors using separate address registers. The microprocessors generate data and control signals in synchronism only if the instructions read from the duplicated memories are identical. For this reason the read only memories do not contain parity bits and parity checking is inhibited during access to these memories. These read only memories can be disabled to allow memory accesses to be made by the master microprocessor over the data bus to an external random access memory. Both microprocessors, however, receive data from the external memory and all other features of the duplex microprocessor arrangement remain unchanged.

Each microprocessor is also connected to a random access memory which contains a local scratch pad memory and an interrupt vector table. This memory can also be disabled to allow accesses to an external random access memory.

The master microprocessor is further connected to a programmable interrupt controller (PIC) via master and local bus transceivers. Data transfers to the PIC and status reading of the PIC is accomplished via local I/O commands. The PIC receives interrupt signals from external subsystems and it determines, under software control, the sequence in which interrupts are presented to the microprocessors.

Each microprocessor is also connected to a hold circuit. This circuit allows external devices to access the microprocessor address, data and control buses, thus providing for implementation of direct memory access for devices requiring this mode of operation. It also provides for diagnostic aids by means of a panel which may require direct communication with the microprocessor buses. Address, data and control signals are "floated" when the microprocessor is in the hold state.

Odd parity is placed on the address and data buses by the address, data and local parity circuits. The address parity circuit includes a duplicate address register to detect failures in the address register which occur before parity is generated and thus would not be detected by traditional parity circuits.

Additional error detection circuits include clock and ready signal monitor circuits. These monitor circuits contain their own oscillators which cause timers to time out and generate an error signal if the monitored clock or ready signal becomes stuck at a logic level 0 or 1.

Each of the comparison, monitor and parity generating circuits associated with each microprocessor circuit also have provisions for self check verification. This self check routining is accomplished by execution of a diagnostic program from the read only memory. This diagnostic program utilizes local I/O commands which set bits in the self check register. These bits then induce failures in the circuits to be routined by forcing miscomparisons through application of data to processing unit A which is different from that applied to processing unit B. The induced failures are then detected by the self check circuit whose status is read by the microprocessor.

The read-only and random-access memories can also be routined. The contents of the duplicated read-only memories are verified to be identical by reading and writing each word sequentially. Any mismatch is then detected by the address and data comparators during this process. The random access memory is verified by execution of a memory exercise program contained in the read only memory.

DESCRIPTION OF THE PREFERRED EMBODIMENT

Figure 1:
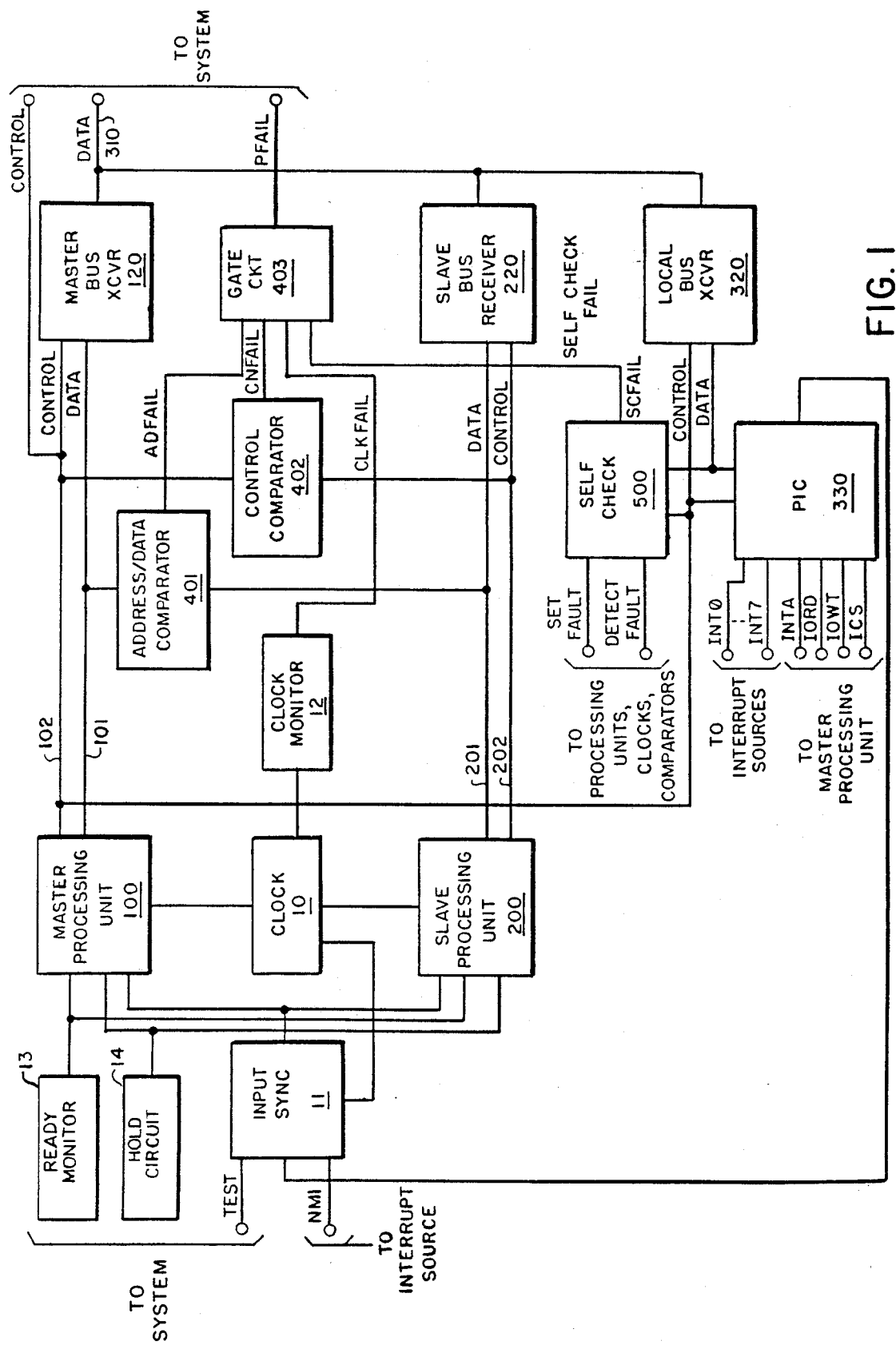
FIG. 1 is a block diagram of a microprocessor control circuit in accordance with the present invention.

Referring now to FIG. 1 the microprocessor control circuit of the present invention is shown. Master processing unit 100 is shown connected to master bus transceiver 120 via master data bus 101. Similarly slave processing unit 200 is shown connected to slave bus receiver 220 via slave data bus 201. Master bus transceiver 120 and slave bus receiver 220 are further shown connected to external data bus 310 which is also connected to local bus transceiver 320. Programmable interrupt controller (PIC) 330 is shown connected between local bus transceiver 320 and processing units 100 and 200 via input sync flip-flop 11.

Processing units 100 and 200 are further shown connected to address and data comparator 401 and control comparator 402, both of which are connected to gate circuit 403. Self check circuit 500 is shown connected to local bus transceiver 320, address and data comparator 401, control comparator 402, and processing units 100 and 200.

Processing units 100 and 200 operate synchronously at a maximum clock frequency of 8 MHZ. Each processing unit applies the address and data signals to its associated internal buses 101 and 201. However, the address and data signals appear at different times. These processing units also operate to generate control signals such as memory read and write signals, and I/O device read and write signals. The address, data and control signals of each processing unit are matched by address, data and control comparators, 401 and 402, for each memory and I/O bus transfer cycle. This matching process provides for continuous monitoring of the integrity of the master processing unit and thus precludes the necessity for extensive diagnostic programs.

A mismatch during any of these bus cycles causes the failed condition to be latched and an external processor failure (P-fail) signal to be provided by gate circuit 403. This circuit also generates a failure signal for clock and self-check failures.

Master bus transceiver 120 sends and receives data via bidirectional data bus 310. However slave bus receiver 220 is only allowed to receive data from this bus. Slave microprocessor 200 is thus providing a matching function only since it is not permitted to place any address or data signals on this system bus.

Programmable interrupt controller (PIC) 330 allows 8 levels of interrupt to be recognized in various priority modes which may be programed into the PIC. This controller communicates with duplicated processing units 100 and 200 via local bus transceiver 320. PIC 330 is connected to external sources of interrupts via leads INT0-INT7. This circuit is preprogrammed by processing unit 100 via local bus transceiver 320. Upon detection of interrupts, PIC 330 generates a signal on the INTR lead which is synchronized by input sync flip-flop 11 before being presented to processing units 100 and 200.

Each of the comparison circuits have provisions for self check verification. This self check routine is accomplished under control of self check circuit 500. Processing unit 100 sets fault bits in self check circuit 500 via local bus transceiver 320. These bits force fault or miscomparison conditions in the associated circuit to be routined. Self check circuit 500 then monitors these comparison circuits for detection of the forced fault. Processing unit 100 can than read the status of detected fault signals from self check circuit 500 in order to verify the proper functioning of the comparison circuits.

Address and data comparator 401 and control comparator 402 are well known in the art. A typical example of such circuits as Intel's 74S85.

Figure 2:
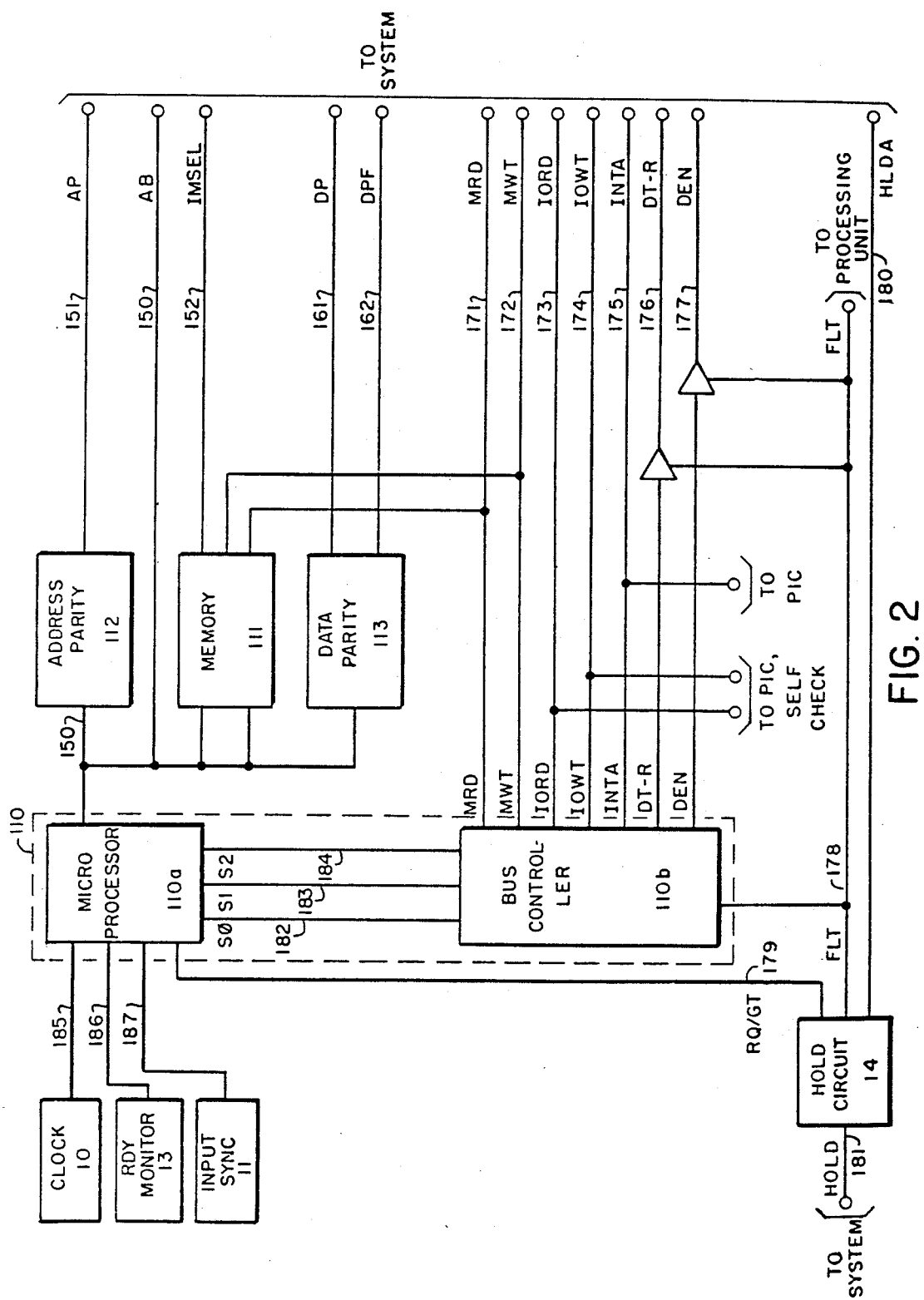
FIG. 2 is a block diagram of the master processing unit shown in FIG. 1.

Referring now to FIG. 2, processing unit 100 of FIG. 1 is shown. Microprocessor 110a is shown connected to memory 111, address parity circuit 112 and data parity circuit 113 via address and data bus 150. Microprocessor 110a is also shown connected to bus controller 110b via status leads 182, 183 and 184 and to hold circuit 14 via request/grant lead 179. Microprocessor circuit 110 is further shown connected to a clock 10, ready monitor 13 and input sync 11 via leads 185–187.

Microprocessor circuit 110 operates to generate both address and data signals over bus 150. However, since these signals appear at different times, memory circuit 111, address parity circuit 112 and data parity circuit 113 respond to data signals when they are placed on bus 150 and address signals only when those signals are placed on bus 150. Both address parity circuit 112 and data parity circuit 113 generate odd parity bits.

Microprocessor circuit 110 has the capability of reading and writing from memory 111 or it can read or write from external memories via bus 150. To allow external memory accesses, address parity lead 151 and bus 150 are shown connected to the remainder of the system. Lead 152 provides an additional control signal to the remainder of the system and indicates when the internal memory has been selected.

Data parity circuit 113 is shown connected to the remainder of the system via leads 161 and 162. These leads provide external indications of the data parity bit and data parity failure signal respectively. The data parity bit and data parity failure signal provide an indication of the integrity i.e., good or bad parity, of data transfers between the processor and external memory.

In addition to the data signals generated on bus 150 by microprocessor circuit 110, it also generates control signals on status leads 182, 183 and 184. Bus controller 110b operates to decode these status signals and generate memory read and write signals (MRD, MWT), I/O read and write signals (IORD, IOWT), an interrupt acknowledge signal (INTA), a transceiver direction signal (DT-R), and a transceiver enable signal (DEN), on leads 171–177.

Hold circuit 14 is shown connected to the remainder of the system via lead 181. It operates in response to a signal on this lead to generate a request signal on lead 179 to microprocessor circuit 110. Microprocessor 110 then generates a grant signal on lead 179 when its current instruction cycle is complete. It can then allow an external processing unit to gain control of its memory. Hold circuit 14 responds to this grant signal by generating a float signal on lead 178 which causes the control signals to go into a tri-state float condition. Hold circuit 14 also generates a hold acknowledge signal on lead 180 to inform the external processing unit that it has control of the microprocessor bus.

Microprocessor 110a and bus controller 110b are well known in the art. Typical examples are Intel's 8086 and 8288 respectively.

Figure 3:
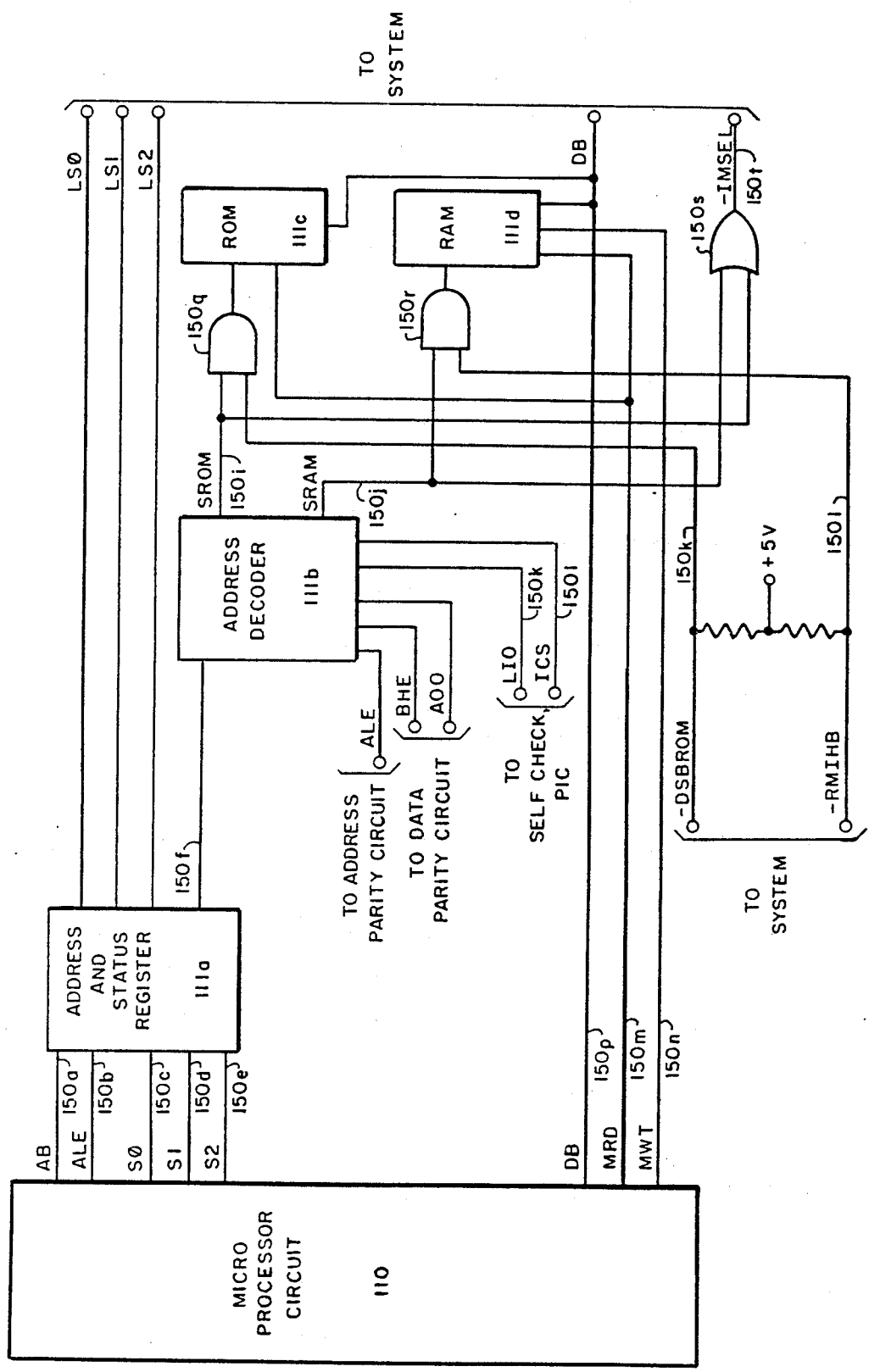
FIG. 3 is a block diagram showing the memory circuit of FIG. 2.

Referring now to FIG. 3 the circuitry of memory block 111 of FIG. 2 is shown. Microprocessor circuit 110 is shown connected to address and status register 111a. The address bus signals are transmitted via lead 150a and an address latch enable signal is transmitted via lead 150b. Status signals S0, S1 and S2 are transmitted by leads 150c–e. Address and status register 111a operates in response to the address latch enable signal to latch the address and status signals. The latched address signals appear on lead 150f. Address decoder 111b decodes these address bus signals and generates either a select read-only memory signal on lead 158i, a select random-access memory signal on lead 150j, a local I/O signal on lead 150k or an interrupt chip select signal on lead 150l. Read-only memory 111c and random-access memory 111d respond to their respective select signals and memory read or write signals on leads 150m and 150n, and ROM or RAM address signals, ROMAD and RAMAD respectively, to transfer data between memory and data bus 150p.

Leads 150w and 150x allow a manual control of the read-only memory and random-access memory select signals. This allows for use of an external memory in place of these memories during debugging. If lead 150w or 150x is grounded either read-only memory 111c is disabled or random-access memory 111d is inhibited via gates 150q and r respectively. In such a case the data bus, address signals and read and write signals are transmitted to an external memory. To prevent conflicts between the internal read-only or random-access memories and an external memory, gate 150s generates an internal memory selected (IMSEL) signal on lead 150t in response to either the read-only memory select or random-access memory select signals on leads 150i and j. This signal is then used to inhibit any external memory which is in a common address space.

Figure 4:
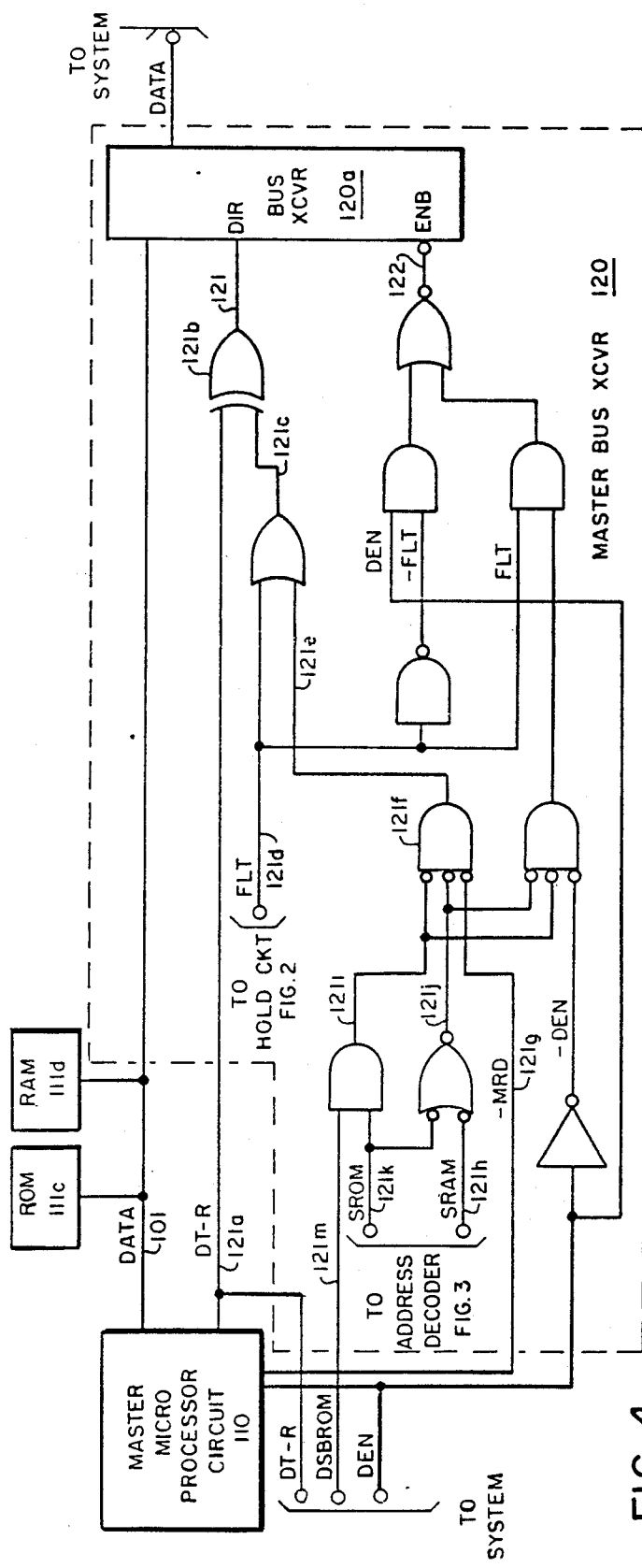
FIG. 4 is a logic diagram showing the master bus transceiver of FIG. 1.

Referring now to FIG. 4 master bus transceiver 120 is shown. Master microprocessor circuit 110 operates to transfer data to and receive data from the external system via lead 101 and bus transceiver 120a. Also, the external system has the capability of transferring data to and receiving data from random access memory 111d and receiving data from read-only memory 111c via lead 101 and bus transceiver 120a. Bus transceiver 120a operates to control the direction of data flow via its direction (DIR) lead 121. To prevent transient signals from being generated during direction switching, the master bus transceiver only enables data transfers upon receiving an enable signal on lead 122 after having received a direction control signal on lead 121.

Master microprocessor circuit 110 controls the direction flow by applying a data transmit-receive (DTR) signal to bus transceiver 120a via lead 121a and exclusive OR gate 121b. A logic level 1 or 0 signal on lead 121a causes master bus transceiver 120 to transmit or receive data respectively. However this data transmit-receive signal only passes through exclusive OR gate 121b if the signal on lead 121c is at a logic level 0. If this signal is at a logic level 1 then the DT-R signal on lead 121a is inverted by exclusive OR gate 121b.

A logic level 1 signal appears on lead 121c in response to either a float signal on lead 121d or a logic level 1 signal on lead 121e which represents a read access to read-only memory or random-access memory 111c or d. Under such conditions the DT-R=0 signal associated with a memory read is inverted to transmit the data read from memory to the external system via bus transceiver 120a. This data is presented to the external system in response to an internal memory read request as a debugging aid. This data is also presented to the external system in response to reading the internal memory during the float (FLT) condition since in that case an external processor accessed this memory.

Gate 121f generates the required logic level 1 signal only if all three of its inputs are at a logic level 0. During a read access the inverted memory read (-MRD) signal on lead 121g is at a logic level 0. If the random access memory is selected a logic level 1 signal appears on lead 121h thereby causing a logic level 0 signal on lead 121j. Since the random-access and read-only memories cannot be selected simultaneously the select read-only memory (SROM) signal on lead 121k is then at a logic level 0 thereby causing the required logic level 0 signal on lead 121l. If read-only memory is selected, lead 121j continues to have a logic level 0 signal as does lead 121l since when an internal memory is selected the disable read only memory (DSBROM) signal is at a logic level 0 on lead 121m. Thus when master microprocessor circuit 110 writes into a random-access memory 111d, or an external memory, data is transmitted via bus transceiver 120a to the external system. When master microprocessor circuit 110 reads from an internal memory data is also transmitted via bus transceiver 120a to the external system. But only when data is read from an external memory is data received from the external system via bus transceiver 120a since only on external memory reads is lead 121 at a logic level 0.

External systems can also gain control of the buses of master microprocessor circuit 110, random-access memory 111d and read-only memory 111c. In this mode of operation hold circuit 14 of FIG. 2 generates a float signal which causes the control signals of master microprocessor circuit 110 to float. The external microprocessor can then apply its own data transmit-receive (DT-R) signal to lead 121a. In such a condition the float signal causes the data transmit receive signal to be inverted since when an external processing unit reads from random access memory 111d data must be transmitted via master bus transceiver 120 and if such external processing system writes into random access memory 111d data must be received from external system via master bus transceiver 120.

The enable signal for master bus tranceiver 120 is provided on lead 122 when a data enable (DEN) signal is generated in the absence of a float signal or when a data enable signal is generated for an internal memory read during the presence of a float signal.

Figure 5:
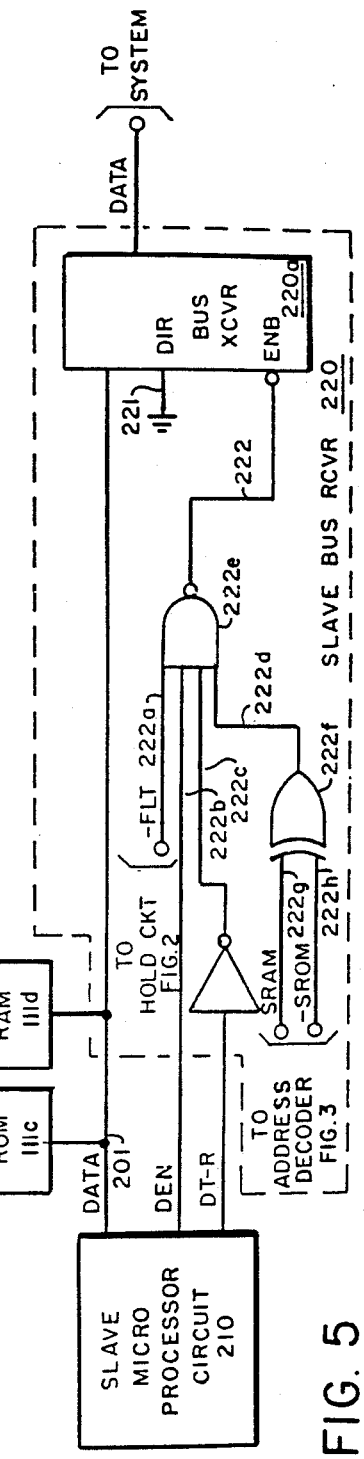
FIG. 5 is a logic diagram showing the slave bus receiver of FIG. 1.

Referring now to FIG. 5 slave bus receiver 220 is shown connected to slave microprocessor circuit 210. The direction control lead 221 of bus transceiver 220a is shown connected to ground since the slave processing unit operates only in a comparison mode is thus not allowed to transmit data to the external system. In this arrangement data is transmitted only from the external system via bus transceiver 220a and data lead 201 to slave microprocessor circuit 210. An enable lead 222 of bus transceiver 220a is controlled by gate 222e. This gate generates a logic 0 enable signal when slave microprocessor circuit 210 generates a logic 1 data enable (DEN) signal and a logic 0 data transmit-receive (DT-R) signal. It is also required that the system not be operating in a float condition and that a logic level 1 signal appear on lead 222d from exclusive OR gate 222f. This exclusive OR gate generates the required logic 1 signal if lead 222g is at a logic level 0 and lead 222h is at a logic level 1, or vice versa. Thus the required logic level 1 signal is generated only if neither the random access nor read only memory is selected. In such a condition the select random-access memory (SRAM) signal on lead 222g is at a logic level 0 and the inverted select read-only memory (-SROM) signal on lead 222h is at a logic level 1. The reverse condition will never occur, that is, there will never be a logic level 1 signal associated with the SRAM signal and a logic level 0 signal associated with the -SROM signal since that represents the selection of both memories at the same time. Also if the random-access memory is not selected and read-only memory is not selected, or vice versa, gate 222f will generate a logic level 0 signal and thereby prevent slave bus transceiver 220a from being enabled.

Figure 6:
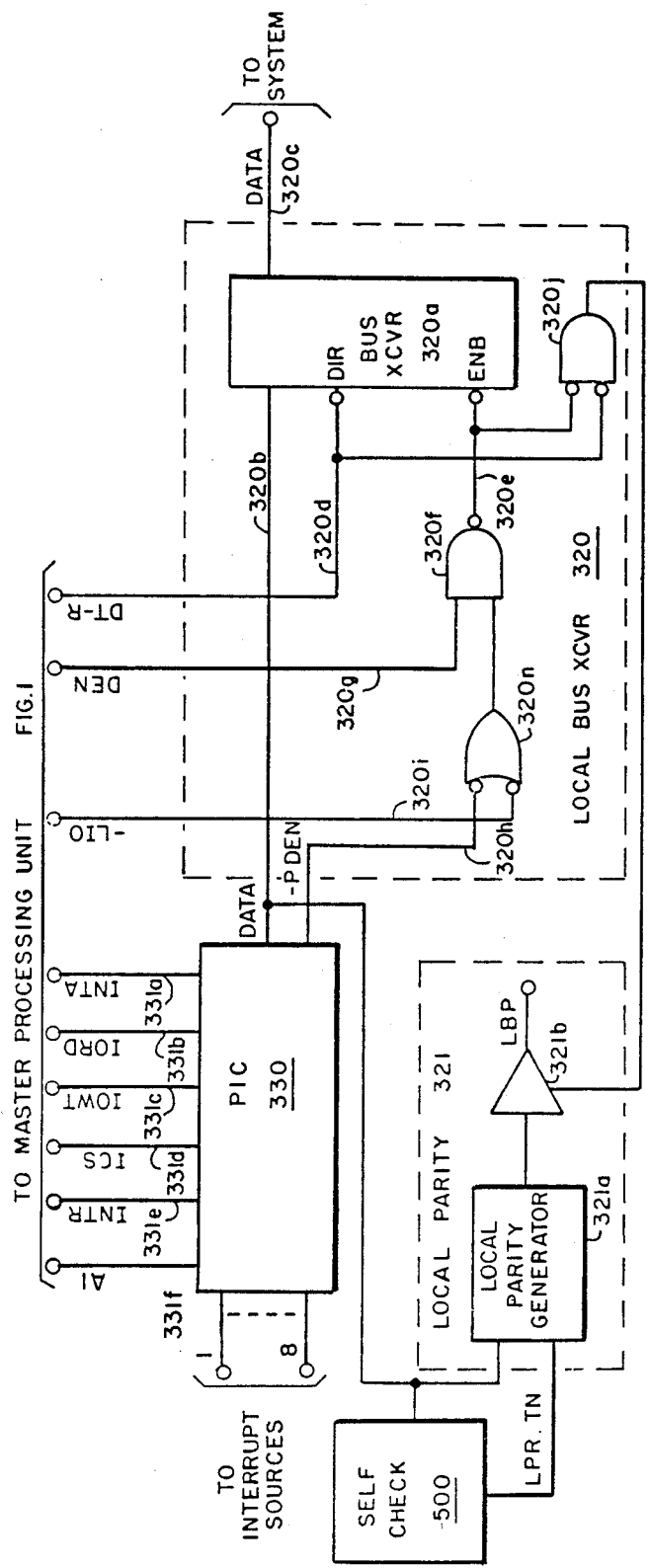
FIG. 6 is a logic diagram showing the local bus transceiver of FIG. 1.

Referring now to FIG. 6 local bus transceiver 320 and local parity circuit 321 are shown connected to self check circuit 500 and programmable interrupt controller (PIC) 330. Bus transceiver 320a operates to transfer data to PIC 330 and self check circuit 500 via lead 320b in response to data being placed on external data bus 320c by master processing unit 100. Bus transceiver 320a also operates to transfer data from PIC 330 and self check circuit 500 to master processing unit 100. The direction of data transmission is controlled by the data transmitreceive (DT-R) signal on lead 320d in the same manner as it controls master bus transceiver 120. The enable signal on lead 320e is generated in response to a data enable (DEN) signal from the master processing unit and either a local I/O (LIO) signal from the master processing unit or an enable signal (PDEN) from the PIC.

Master processing unit 100 generates the DEN signal, a LIO signal and a data receive (DT-R=0) signal when it transmits data to either PIC 330 or self check circuit 500 via local bus transceiver 320. In this manner master processing unit 100 is able to program these circuits. However PIC 330 can also transmit data to master processing unit 100 via local bus transceiver 320. Under such conditions master processing unit 100 generates a data transmit (DTR-1) signal and a DEN signal while PIC 330 generates its own enable (PDEN) signal to enable bus transceiver 320a.

In order to program PIC 330 processing unit 100 generates the required data transmit, data enable and local I/O signals to configure bus transceiver 320a to receive data and transmit it to PIC 330. Master processing unit 100 also generates an I/O write signal on lead 331c and an interrupt chip select (ICS) signal on lead 331d. PIC 330 contains two words into which master processing unit 100 can write or read. The address bit A1 on lead 331f determines which word is accessed. In this manner master processing unit 100 is able to program the priority under which PIC 330 recognizes interrupts.

Upon detection of an interrupt under its preprogrammed priority sequence, PIC 330 generates an interrupt (INTR) signal on lead 331e. Upon detection of this interrupt signal master processing unit 100 generates an interrupt acknowledge (INTA) signal on lead 331a to inform PIC 330 to generate an interrupt vector word identifying the source of the interrupt. In response to the interrupt acknowledge (INTA) signal PIC 330 generates an enable signal (-PDEN) on lead 320i thereby enabling bus transceiver 320a. Master processing unit 100 then configures bus transceiver 320a to allow PIC 330 to transmit data via lead 320b.

Whenever data is transmitted by PIC 330 local parity circuit 321 generates the required odd parity bit. This parity bit is transmitted along with data by tri-state gate 321b in response to an enable signal from gate 320j which corresponds to the enable signal for bus transceiver 320a.

Self check circuit 500 is also shown connected to local parity generator 321a thus providing the means for self check circuit 500 to routine local parity generator 321a.

Bus transceivers 120a, 220a, and 320a are well known in the art. A typical example is Intel's LS245.

Figure 7:
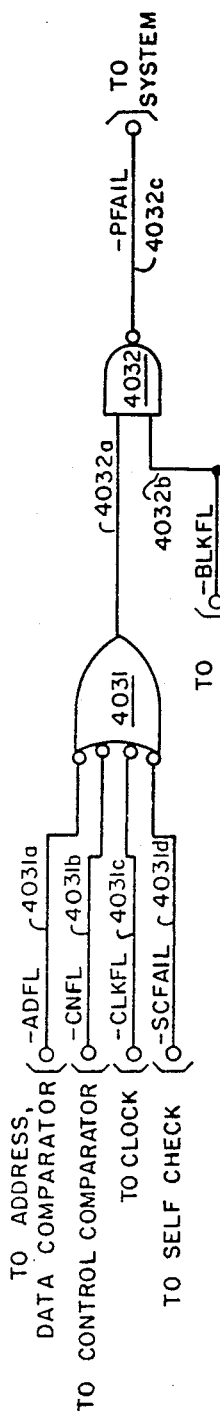
FIG. 7 is a logic diagram showing the gate circuit of FIG. 1.

Referring now to FIG. 7 gate circuit 403 of FIG. 1 is shown. Gate 4031 is shown connected to the address and data comparator via lead 4031a, the control comparator via lead 4031b, the clock circuit via lead 4031c and the self check circuit via lead 4031d. These circuits operate to generate an address miscomparison signal, a control miscomparison signal, a clock failure signal or a self check failure signal. Gate 4031 transmits any of these signals to gate 4032 which generates a processor failure signal on lead 4032c in the absence of a block failure (BLKFL) signal on lead 4032b. Thus the BLKFL signal can be used to prevent processor failure signals from being detected by the external system. This signal would typically be used during maintenance procedures.

Figure 8:
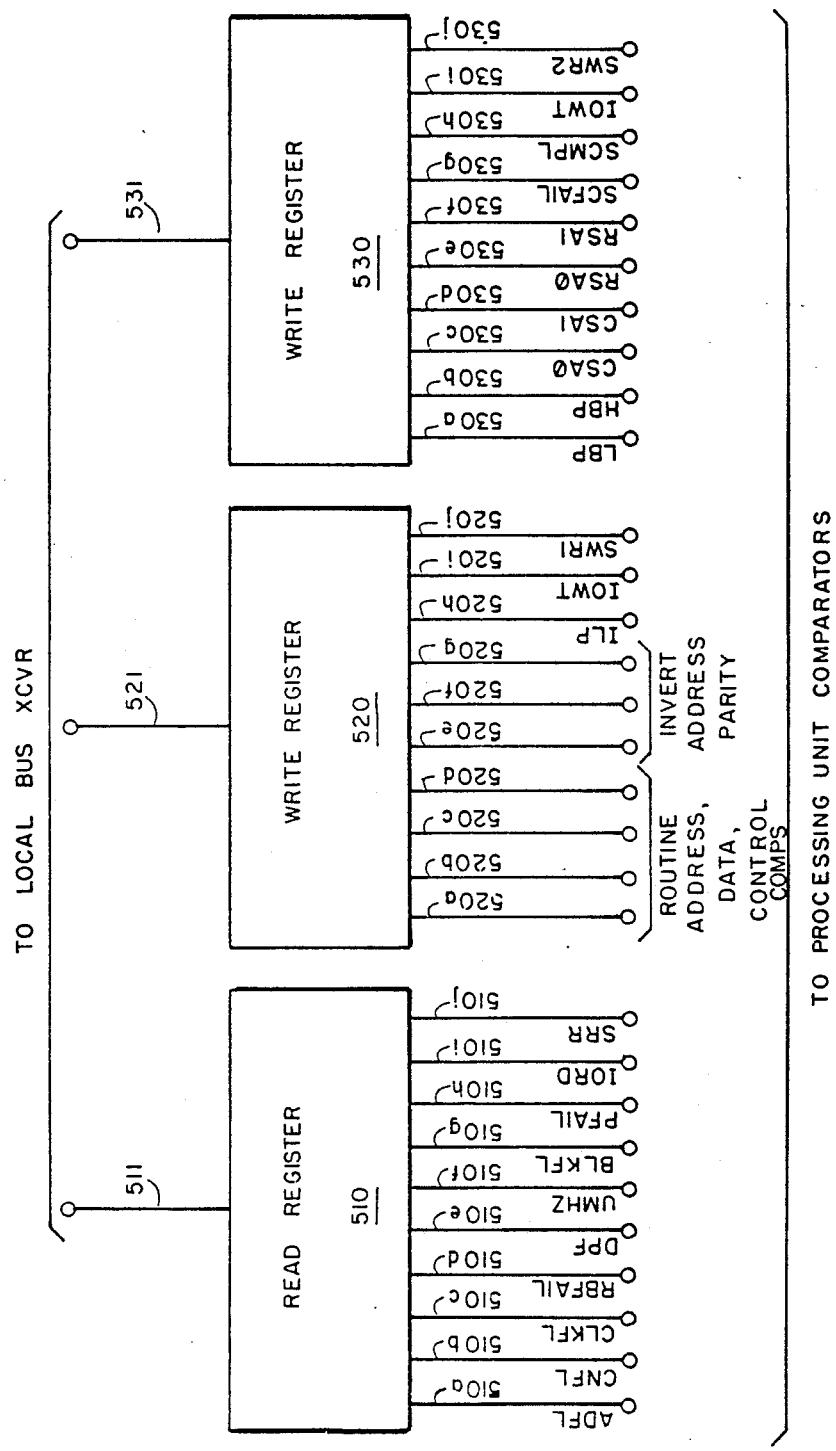
FIG. 8 is a block diagram showing the PIC of FIG. 1.

Referring now to FIG. 8 self check circuit 500 of FIG. 1 is shown. Read register 510, write register 520 and write register 530 are shown connected to the local bus transceiver, the master processing unit and the comparators. The master processing unit transfers data to write registers 520 and 530 over data leads 521 and 531. The master processing unit can thus set an individual register bit which causes a failure in the corresponding circuit to be routined. To transfer such data the master processing unit generates an I/O write (IOWT) command and the appropriate register select command on leads 520i and j or 530i and j. Leads 520a, b, c and d cause failures to be simulated in the address, data and control comparators and thereby allow these circuits to be routined. Leads 520e, f and g cause address parity bits to be inverted and thereby allow routining of the parity circuits. Similarly lead 520h causes the local parity bit to be inverted.

If the bit associated with write register leads 530a and b are set the low and high byte data parity circuits can be routined. Leads 530c, d, e and f are associated with register bits which if set provide for routining of stuck at 0 and stuck 1 conditions in the clock monitor and ready monitor circuits. When the processing unit has determined that the routining is complete it sets the self check complete bit associated with lead 530h. This lead is used to inform the external system the self check sequence is complete which means that processor failure indications are valid and not merely responsive to routining.

The self check circuit detects these forced fault conditions via read register 510. The master processing unit reads the status of these faults by applying an I/O read (IORD) signal to lead 510; and a select read register (SRR) signal to lead 510j. The read register bits are then transmitted to the master processing unit via lead 511 and the local bus transceiver. Read register 510 stores address failures, control signal failures, clock failures, ready bus failures, data parity failures, 4 MHz clock selected, blocked failures and processor failures via leads 510a–h.

In the event that a routining bit is set in either write register 520 or 530 and the fault intended to be induced is not detected the processing unit sets the self check failure bit via lead 530g. Since this lead is also connected to gate circuit 403 the processor failure signal is also generated in response to this bit to inform the external system that a failure has occurred in the self check circuit.

Figure 9:
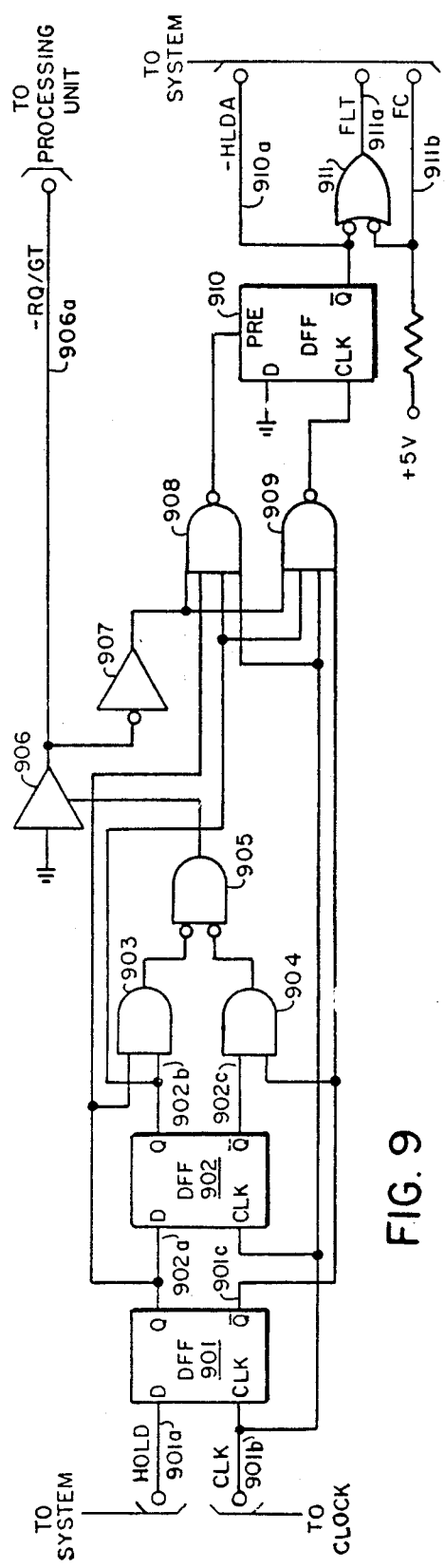
FIG. 9 is a logic diagram showing the hold circuit of FIG. 1.

Referring now to FIG. 9 the hold circuit of the present invention is shown. When an external system requests access to the memories of the system of the present invention it places a logic level 1 hold signal on lead 901a. During the next clock pulse this logic level 1 signal is transferred to the Q output of D-type flip-flop 901. This logic level 1 signal then appears at the D input of D-type flip-flop 902 on lead 902a. At the next successive clock pulse flip-flop 902 transfers this logic level one signal to its Q output and it appears on lead 902b. Thus D-type flip-flops 901 and 902 act as a 2-bit shift register. After flip-flop 901 has clocked in a logic 1 signal to its Q output in response to a hold signal flip-flop 901 has a logic level 1 on its Q output and flip-flop 902 has a logic 0 on its Q output. Similarly flip-flop 901 will have a logic 0 on its $\overline{Q}$ output and flip-flop 902 will have a logic 1 on its $\overline{Q}$ output. Gates 903 and 904 each generate a logic level 0 signal in response to these conditions and gate 905 accordingly generates a logic level 1 signal which turns on tri-state gate 906. When this gate is turned on it places a logic level 0 signal on lead 906a which represents an access request signal to the processing units.

This request signal remains applied until the next clock pulse which causes D-type flip-flop 902 to transfer the logic level 1 signal on its D input to its Q output. In this situation gate 903 generates a logic level 1 signal in response to a logic level 1 on both of its inputs. This causes gate 905 to generate a logic level 0 signal thereby turning off tri-state gate 906 and when this gate is turned off it removes the request signal by placing a logic level 1 signal on lead 906a. Thus the request signal is a pulse having the same duration as one clock cycle.

When the processing unit has determined that it can release control of its buses and memory it applies a logic level 0 grant signal on lead 906a. This logic level 0 signal is inverted to a logic level 1 signal by inverter 907 and applied to gate 908. Since the Q outputs of both flip-flops 901 and 902 are also at a logic level 1, when the next clock pulse appears gate 908 generates a logic level 0 signal on the pre-set input of D-type flip-flop 901 thereby causing a logic level 0 hold acknowledge signal to appear on lead 910a. This signal is used to inform the external system that it now has control of the internal buses and memory. Gate 911 also responds to the hold acknowledge signal to generate a float signal which is used by the processing units to float the buses and control signals. Gate 911 also generates this float signal in response to a float command on lead 911b from the external system.

When the external system is ready to release control of the processing units it removes the hold signal from lead 901a. During the next clock pulse on lead 901b D-type flip-flop 901 transfers the logic 0 signal on lead 901a to its Q output and places a logic level 1 signal on its $\overline{Q}$ output. Consequently gate 903 and 904 again generate logic level 1 signals causing a logic level 1 signal on the output of gate 905 thereby turning on tri-state gate 906 and applying a second logic level 0 request signal on lead 906a.

This second request signal also has a duration equal to the period of one clock cycle. This request signal informs the processing units that they can regain control of their buses and memory. Since flip-flop 901 is reset and flip-flop 902 is set gate 909 generates a logic level 0 signal at the next clock pulse thereby clocking a logic level 1 signal onto the output of flip-flop 910. Thus the hold acknowledge signal is removed and the external system is informed that the processing units have regained control of their buses and memory.

Figure 10:
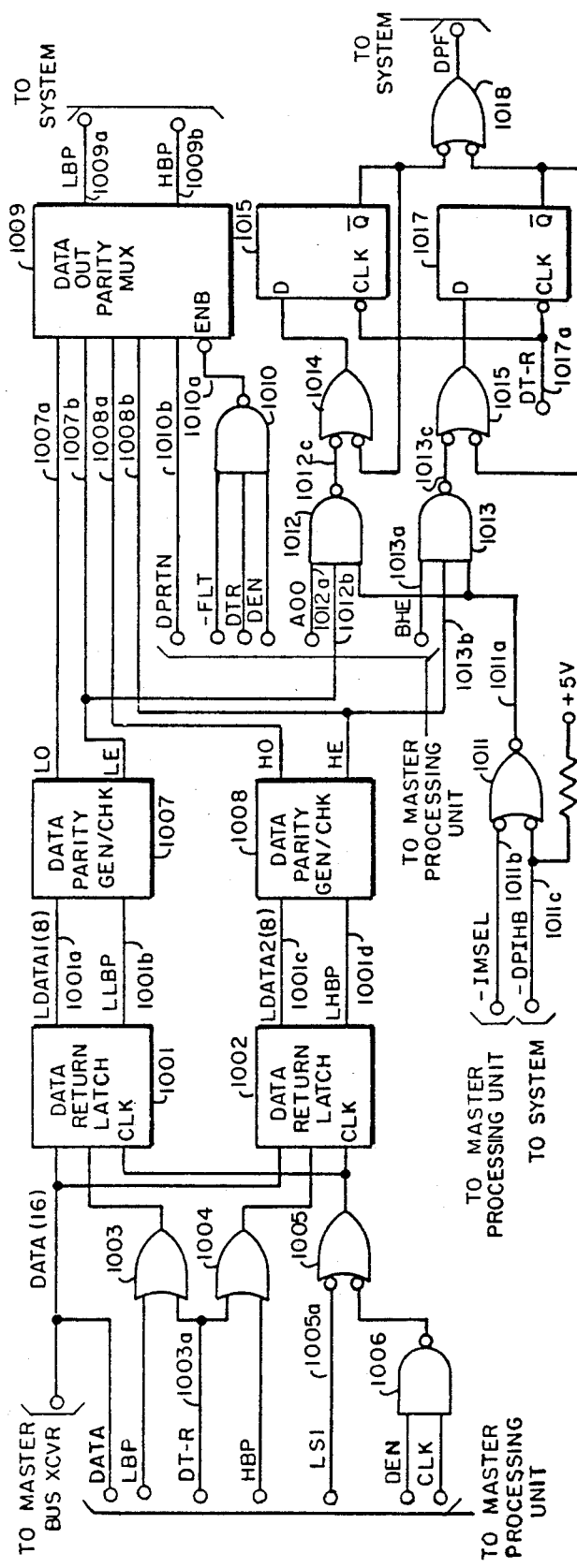
FIG. 10 is a logic diagram showing the data parity circuit of FIG. 2.

Referring now to FIG. 10 the data parity circuit of the present invention is shown. Data return latches 1001 and 1002 are shown connected to gates 1003 and 1004 respectively. Both of these latches are clocked when the master processing unit executes a memory or I/O read instruction. Gate 1006 generates a logic level 0 signal in response to a data enable (DEN) signal and a clock signal. The data enable signal occurs in response to a memory read instruction. Gate 1005 generates a clock signal for data return latches 1001 and 1002 in response to the occurrence of a memory read instruction or an I/O read instruction when latched status signal 1 on lead 1005*a* is equal to logic level 1. The pulse generated by gate 1005 operates as a clock signal for latches 1001 and 1002 which transfer the status of the 16 data leads to the 8 latched data 1 (LDATA1) leads and 8 latched data 2 (LDATA2) leads.

During data transmit instructions, latched status signal 1 (LS1) on lead 1005*a* is set to logic 0 by the processor to indicate a data output operation. This causes the clock inputs of data return latches 1001 and 1002 to become forced to logic 1 for the entire data transmit instruction. Since data return latches 1001 and 1002 are of the transparent type, when their clocks are forced to logic 1, their outputs (LDATA1, LLBP, LDATA2, LHBP) will follow (be equal to) their data inputs. Therefore, during data transmit instructions, the data return latches simply pass their input data to their corresponding data parity generator/checker circuits 1007 and 1008. During processor read cycles (data receive), latched status signal 1 (LS1) is set to 1 by the processor to indicate an I/O or memory read operation. In this case the output of gate 1005 will be a clock pulse which is the logical "and" of DEN and CLK from gate 1006. This pulse from the output of gate 1005 is then applied to the CLK inputs of data return latches 1001 and 1002 and will latch the data and parity bits returned from the external memory or I/O device. This latched data (LDATA1, LLBP, LDATA2, LHBP) is then presented to data parity generator/checker circuits 1007 and 1008 for data return parity checking.

During data transmit instruction the data transmit-receive (DT-R) signal on lead 1003*a* is also at a logic level 1. Gates 1003 and 1004 transmit this logic level 1 signal to data return latches 1001 and 1002 and cause a logic level 1 signal to appear on leads 1001*b* and 1001*d* as latched low byte parity bit (LLBP) and latched high byte parity bit (LHBP). The 8 low byte data bits on lead 1001*a* and the associated latched low byte parity bit on lead 1001*b* are transferred to data parity generator and checker circuit 1007. Similarly the 8 latched data bits associated with the high byte and the associated latched high byte parity bit on leads 1001*c* and 1001*d* are transferred to data parity generator and checker circuit 1008.

These parity checking circuits operate to generate odd parity. During data transmit instructions a logic level 1 signal appears on leads 1001*b* and 1001*d*. If odd parity is detected an odd parity bit is generated on leads 1007*a* and 1008*a*. This odd parity bit is required even though odd parity was detected across 9 leads, since one of them was forced to a logic level 1 by the DT-R signal. Thus the 8 data leads had to have even parity to cause the parity checking circuits to generate an odd parity bit.

Data parity multiplex 1009 operates to transfer the signals on leads 1007*a* and 1008*a* to leads 1009*a* and 1009*b* respectively, in response to a logic level 0 enable signal on lead 1010*a* and a logic level 0 data parity routine signal on lead 1010*b*. A logic level 0 signal appears on lead 1010*b* when the data parity routine signal is not present. Also a logic level 0 signal appears on lead 1010*a* when gate 1010 detects a data enable (DEN) signal, a data transmit (DT-R=1) signal and the absence of a float (FLT) signal. Thus when data parity is not being routine data parity multiplex 1009 transfers the low and high odd parity bits appearing on leads 1007*a* and 1008*a* to the low and high byte parity bits on leads 1009*a* and 1009*b* for use by the external system.

When the processing unit determines that parity is to be routined it generates a logic level 1 data parity routine signal on lead 1010*b*. Data parity multiplex 1009 responds to this signal by gating the status of leads 1007*b* and 1008*b* to leads 1009*a* and 1009*b*. Since leads 1007*b* and 1008*b* have opposite logic signals then those appearing on these 1007*a* and 1008*a* data parity multiplex 1009 operates to invert the parity bits appearing on leads 1009*a* and 1009*b*, thus forcing parity errors in the external system for routining purposes.

Similarly if even parity was detected by parity checking circuits 1007 and 1008 during a data transmit instruction (DT-R=1) a logic level 0 signal would appear on leads 1007*a* and 1008*a*. This would cause the low and high byte parity bits on leads 1009*a* and 1009*b* to be a logic level 0. This is correct since the 8 data leads associated with each checker had to have odd parity in order for even parity to be detected when DT-R=1.

If data parity checkers 1007 and 1008 detect even parity as represented by a logic level 1 signal on leads 1007*b* and 1008*b* on data receive instructions (DT-R=0), then a data parity failure has been detected. These even parity failure signals appear at gates 1012 and 1013. If data parity checking is not inhibited (-DPIHB=1) and internal memories are not selected (-IMSEL=1) then gate 1011 generates a logic level 1 signal on lead 1011*a*. When an even byte is addressed by the processing unit a logic level 1 AØØ signal appears on lead 1012*a*. When the processing unit addresses the high byte a logic level 1 bit high enable (BHE) signal appears on lead 1013*a*. If the processing unit addresses a full 16 bit word then logic level 1 signals appear on both the AØØ and BHE leads.

Thus gates 1012 and 1013 are enabled when the corresponding low or high byte is enabled, data parity is not inhibited and external memory is selected. In such cases the low and high even parity signals are transferred to gates 1012 and 1013 respectively via leads 1012*b* and 1013*b*. If an even parity logic level 1 signal appears on either lead 1012*b* or 1013*b* under these conditions gates 1012 and 1013 generate a logic level 0 signal on leads 1012*c* and 1013*c*. Gates 1014 and gates 1015 respond to these logic level 0 signals by generating a logic level 1 signal at the D input of D-type flip-flops 1015 and 1017. When these flip-flops are clocked by a data transmit (DT-R=1) signal on lead 1017*a* a logic level 1 signal at their D input is stored in these flip-flops. This causes a logic level 0 signal to appear at their $\overline{Q}$ outputs. Gate 1018 responds to a logic level 0 signal, representing a data parity failure, at the $\overline{Q}$ output of flip-flops 1015 and 1017 by generating a data parity failure signal to the external system.

This data parity failure detection process can be inhibited however if a logic level 0 signal appears on lead 1011*a*. Gate 1011 generates such a logic level 0 signal in response to a logic level 0 signal on lead 1011*b* or 1011*c*. The external system can inhibit this data parity failure detection by placing a logic level 0 data parity inhibit (DPIHB) signal on lead 1011*c*. The processing unit also inhibits data parity failure detection by placing a logic level 0 internal memory select (IMSEC) signal on lead 1011*b*. The processing unit generates the internal memory select signal during accesses to the internal random access or read only memory. Data parity failure detection is inhibited during such accesses because these memories are duplicated in the master and slave processing units. Since failures in these memories are detected by the comparator circuits, there is no need for data parity failure detection for these memories.

Data parity generator and checker circuits 1007-8 and data parity multiplex 1009 are well known in the art. Typical examples are Intel's 74S28 and 74S257 respectively.

Figure 11:
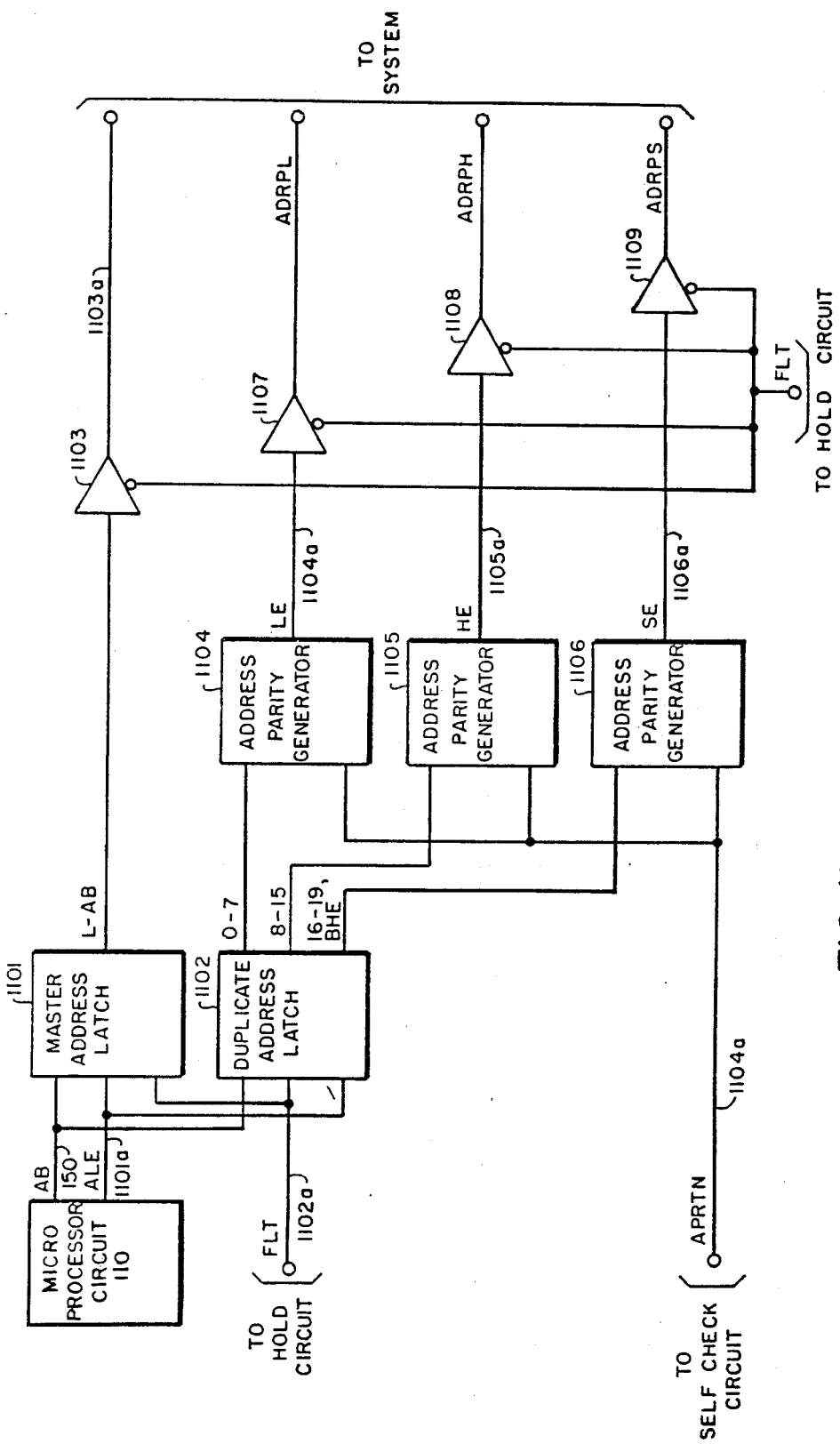
FIG. 11 is a logic diagram showing the address parity circuit of FIG. 2.

Referring now to FIG. 11 the address parity circuit of the present invention is shown. Microprocessor circuit 110 is shown connected to master address latch 1101 and duplicate address latch 1102 via address bus 150 and address latch enable (ALE) lead 1101a. Master address latch 1101 and duplicate address latch 1102 are further connected to the hold circuit via float (FLT) lead 1102a. Master address latch 1101 operates to store address bits 0-19 and the byte high enable (BHE) signal in response to an address latch enable (ALE) signal on lead 1101a. These data bits are then available to the external system via latched address bus 1103a.

Typically in the prior art parity bits were generated from the latched address bits. However such an arrangement can lead to potential undetected errors. If a bit were to fail in the master address latch the parity circuit would generate the proper parity bit to correspond to the address generated with the dropped address bit. In such a case a parity failure would not be detected since compensating parity was generated by the parity circuit. However the address latch referenced an incorrect memory location thereby resulting in a software error.

This problem was overcome in the present invention through use of duplicate address latch 1102, to which address parity generators 1104, 1105 and 1106 are connected. The duplicate address latch operates to store the same address bits as master address latch 1101 and it does so in response to the same address latch enable signal on lead 1101a. Address parity generator 1104 generates parity for address bits 0-7, address parity generator 1105 generates parity for address bits 8-15 and address parity generator 1106 generates parity for address bits 16-19 and byte high enable signal BHE. The actual address signals comprising address bits 0-19 and byte high enable signal BHE are still presented to the external system via latched address bus 1103a. However address parity bits for the low, high and segment portions of the address bus are generated by address parity generators 1104, 1105 and 1106 which are connected to duplicate address latch 1102.

Address parity generators 1104, 1105 and 1106 generate low even, (LE) high even (HE) or segment even (SE) signals on leads 1104a, 1105a or 1106a in response to detection of even parity on their corresponding address signal input leads. Thus the low even, high even and segment even signals respresent the low, high and segment parity bits required to provide odd parity.

When the address parity circuitry is to be routined the self check circuit applies a logic level 1 address parity routine (APRTN) signal to lead 1104a. Address parity generators 1104, 1105 and 1106 operate in response to this signal to invert the parity bit. Since each generator now detects an additional logic level 1 input signal it detects the opposite parity across these input signals since they now include the additional address parity routine signal. Thus the external parity detection circuits can be routined for their ability to detect parity failures since even parity is generated in response to the address parity routine signal. The latched address bus, master address latch, duplicate address latch and address parity leads are all connected to tri-state gates which are disabled by the float (FLT) signal from the hold circuit. Therefore when the hold circuit generates the float signal, these circuits go into a tri-state or high impedance condition and have no effect on the external system.

Figure 12:
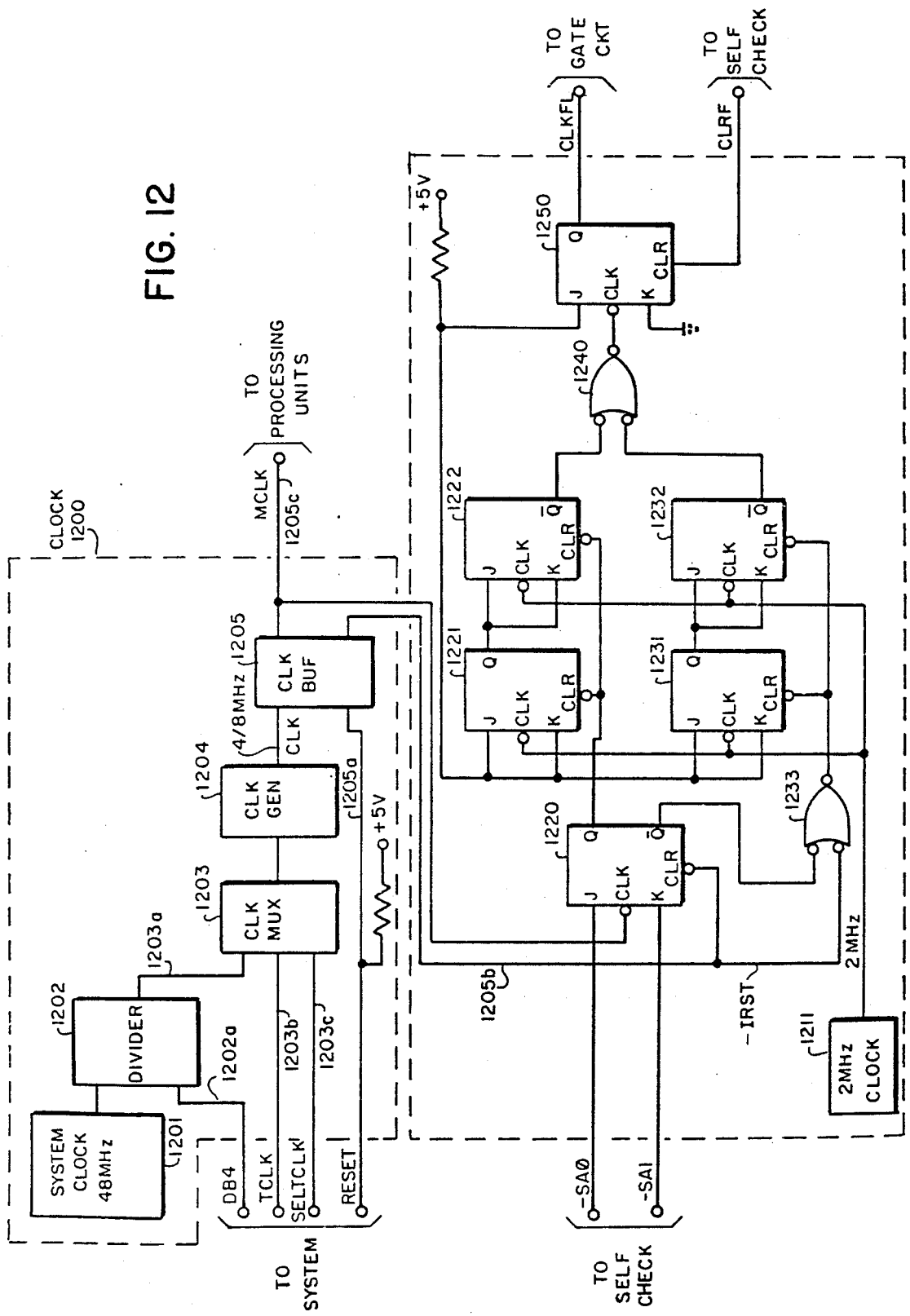
FIG. 12 is a logic diagram showing the clock monitor of FIG. 1.

Referring now to FIG. 12 the clock monitor circuit 1210 of the present invention is shown. This circuit comprises two ranks of monitoring flip-flops. The upper rank consists of flip-flops 1221 and 1222 while the lower rank consists of flip-flops 1231 and 1232. The monitoring process involves setting up a race condition between the clock to be monitored and a predetermined time out controlled by a separate 2 MHz clock 1211 which drives the lower and upper ranks of flip-flops. Thus if either the lower or upper rank of monitor flip-flops counts two internal clock pulses before an external clock pulse appears from the monitored clock, output flip-flop 1250 will generate a clock failure signal.

In this preferred embodiment a clock monitor circuit is arranged to be able to monitor either a 8 MHz, 4 MHz or test clock. The system clock 1201 generates a 48 MHz clock signal which is normally divided by divider 1202 into a 24 MHz clock signal. However in the event that a logic level 1 divide-by-4 (DB4) signal appears on lead 1202a, divider 1202 divides the system clock by 4 thereby providing a 12 MHz clock signal. Clock multiplex 1203 is shown connected to divider 1202 and to the system via leads 1203b and c. The 12/24 MHz clock signal is normally gated by clock multiplex 1203 to clock generator 1204. However if the external system selects the test clock by providing a logic level 1 select test clock (SELTCLK) signal on lead 1203c then an external test clock generator connected to lead 1203b is gated to clock generator 1204 by clock multiplex 1203. Clock generator 1203 further divides its input clock signal by 3 which, except for the case of the test clock signal, results in a 4 or 8 MHz signal appearing at the clock input to clock buffer 1205. Clock buffer 1205 thus generates a master clock signal to the processing units on lead 1205c. Clock buffer 1205 is also shown connected to reset lead 1205a. If a logic level 0 reset signal is applied to lead 1205a clock buffer 1205 generates a logic level 0 internal reset (IRST) signal on lead 1205b.

Clock circuit 1200 is shown connected to clock monitor circuit 1210 via master clock lead 1205c and internal reset lead 1205b. Clock monitor circuit 1210 includes input flip-flop 1220 whose clock lead is shown connected to clock buffer 1205 via lead 1205c. Two MHz reference clock 1211 is shown connected to the clock input of flip-flops 1221, 1222, 1231 and 1232. The J and K inputs of flip-flops 1221 and 1231 are shown connected to a plus 5 volt power supply while the J and K inputs of flip-flops 1222 and 1232 are shown connected to the Q output of flip-flops 1221 and 1231 respectively. The inputs to gate 1240 are shown connected to the $\bar{Q}$ outputs of gates 1222 and 1232 while the output of gate 1240 is shown connected to the clock input of output flip-flop 1250. The Q output of this flip-flop indicates clock failure to the system via the gate circuit.

When the clock monitor is initially cleared by a logic level 0 internal reset (-IRST) signal on lead 1205b, input flip-flop 1220 and monitor flip-flops 1231 and 1232 are reset. Since the Q output of input flip-flop 1220 is therefore at a logic level 0, it holds flip-flops 1221 and 1222 in the reset condition thereby causing a logic level 1 signal on the $\bar{Q}$ output of flip-flop 1222. When the -IRST signal is returned to logic 1, flip-flops 1231, 1232 and 1221, 1222 are free to operate in response to clock pulses from 2 MHz reference clock 1211. Since the J and K inputs of flip-flop 1231 are at a logic level 1 state, this flip-flop clocks a logic level 1 signal to its Q output on a falling edge of the first clock pulse. Since the Q output of flip-flop 1231 appears at the J and K inputs of flip-flop 1232 this flip-flop clocks a logic level 0 signal to its $\bar{Q}$ output on the trailing edge of the second clock pulse. This logic level 0 output signal is transferred by gate 1240 to the clock input of output flip-flop 1250 causing it to clock the logic level 1 signal on its J input to its Q output thereby generating the clock failure signal.

However this clock failure signal is not generated if the trailing edge of a master clock signal appears at the clock input of input flip-flop 1220 before the trailing edge of the second clock pulse from reference clock 1211. In this case input flip-flop 1220 toggles causing its Q output to have a logic level 1 signal and its $\bar{Q}$ output to have a logic level 0 signal. This logic level 0 signal is transferred by gate 1233 to the clear input of flip-flops 1231 and 1232, thereby causing them to reset and preventing generation of the clock failure signal. Thus the monitor process operates under a race or time-out condition whereby the clock failure signal is generated within 2 clock pulses of the reference clock unless a falling edge of the master clock signal occurs before the falling edge of the second reference clock pulse.

When the input flip-flop 1220 was clocked to cause a logic level 1 signal to appear on its Q output that also removed the clear condition from flip-flops 1221 and 1222. These flip-flops are then free to operate in response to 2 MHz reference clock 1211. In a manner similar to flip-flops 1231 and 1232, flip-flops 1221 and 1222 cause a logic level 0 signal to appear at gate 1240 after the falling edge of a second clock pulse thereby causing a clock failure signal. However if a master clock pulse appears at the clock input of input flip-flop 1220 it again toggles causing a logic level 0 signal to appear at its Q output thereby clearing flip-flops 1221 and 1222 and removing the source of the clock failure signal.

This monitor circuit can be routined by the self check circuit by placing a logic level 0 signal on either the stuck-at-0 (SA∅) lead connected to the J input of input flip-flop 1220 or the stuck-at-1 (SA1) input connected to the K input of flip-flop 1220. This circuit is routined by placing it in such condition as to allow it to count to the alarm condition. For example, if a logic level 0 is placed on the stuck-at-0 input, flip-flop 1220 clocks a logic level 0 signal to its Q output thereby clearing flip-flops 1221 and 1222 and allowing flip-flops 1231 and 1232 to count in response to 2 MHz reference clock. However as long as the stuck-at-0 signal is applied to flip-flop 1220 any master clock pulses appearing at the clock input of this flip-flop do not cause flip-flop 1220 to toggle thus preventing flip-flops 1231 and 1232 from resetting. Therefore these flip-flops count up to the clock failure time-out condition and generate the clock failure signal. In this manner the failure detection operation of the clock monitor circuit can be verified.

Similarly, by placing a logic level 0 signal on the stuck-at-1 input, flip-flop 1220 clocks a logic level 0 signal to its $\bar{Q}$ output thereby resetting flip-flops 1231, 1232 and allowing flip-flops 1221 and 1222 to count in response to 2 MHz reference clock 1211. Again, in this condition, flip-flops 1221 and 1222 count to their clock failure time out count since the stuck-at-1 signal prevents flip-flop 1220 from toggling in response to a master clock signal. As a result flip-flops 1221 and 1222 are prevented from being cleared before they time out.

Thus the clock monitor circuit generates a clock failure alarm if the master clock signal does not appear within 2 negative going edges of the reference clock signal. Since a 2 MHz reference clock signal was choosen it has a period of 500 nanoseconds. Therefore two complete clock pulses take 1 microsecond. The normal arrangement of clock circuit 1200 provides an 8 MHz master clock signal which has a 125 nanosecond period. Thus this monitor circuit detects a clock failure if a clock pulse does not appear within the time allowed for 8 master clock pulses.

By adjusting the frequency of the reference clock and the number of flip-flops in the upper and lower ranks of monitor flip-flops, the monitor circuit can be tuned to any desired accuracy including detection of the absence of 1 master clock pulse.

Figure 13:
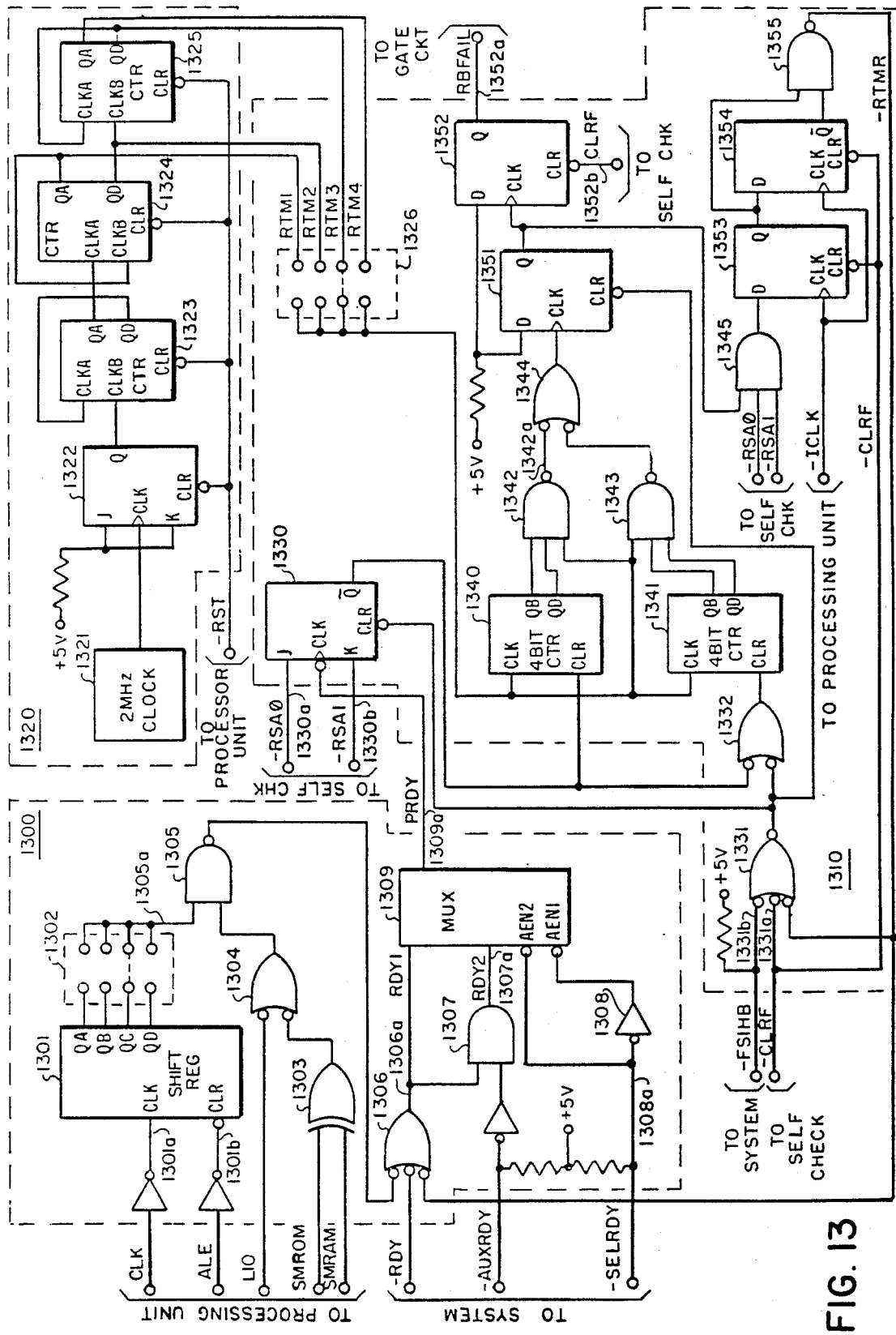
FIG. 13 is a logic diagram showing the ready monitor of FIG. 1.

Referring now to FIG. 13 the ready monitor circuit of the present invention is shown. Shift register 1301 is shown connected to the processing unit via leads 1301a and *b*. The processing unit generates an address latch enable (ALE) signal at the beginning of every instruction cycle. Since this signal is applied to shift register 1301 via lead 1301b, shift register 1301 is cleared at the beginning every instruction cycle of the processing unit. After being cleared shift register 1301 generates a series of logic 1 signals on its QA, QB, QC and QD outputs in response to successive clock pulses on lead 1301a.

Strapping field 1302 cnnected to shift register 1301 provides facility for connecting any of the outputs of shift register 1301 to gate 1305. Thus shift register 1301 and strapping field 1302 operated as a wait-state generator, since, by selecting which output is connected to gate 1305, a level 1 signal can be provided immediately after the first, second, third or fourth clock pulse corresponding to outputs QA, QB, QC and QD. Thus wait-states equal to 0, 1, 2 or 3 clock pulses can be provided on lead 1305a.

These wait-states are choosen to provide an amount of time equal to the slowest internal memory or I/O device to be accessed by the processing unit. Thus the processing unit is forced to wait the required time before looking at data provided by the slower memory or I/O devices.

Exclusive OR gate 1303 enables the selected wait signal via gate 1304 when either the read only memory or random access memory but not both is selected. This condition is defined by the select master ROM (SMROM) and select master RAM (SMRAM) signals. Gate 1304 also enables the selected wait signal in response to a local I/O access as defined by the local I/O (LIO) signal. Gate 1305 generates the internal ready (IRD4) signal in response to the ready-only memory, random-access memory or local I/O access and the selected wait signal.

This internal ready signal along with an external ready (-RDY) signal appears at gate 1306 which generates a ready-1 (RDY1) signal on lead 1306a. Multiplex 1309 transfers this RDY1 signal to lead 1309a as a processor ready (PRDY) signal in response to a logic level 0 signal at the auxiliary enable-1 (AEN1) input. A logic level 0 signal normally appears at this input since the inverted select ready (-SELRDY) signal is normally a logic level 1. Similarly multiplex 1309 provides a logic level 1 PRDY signal in response to a logic level 0 auxiliary enable-2 (AEN2) signal and a ready-2 (RDY2) signal on lead 1307a. Gate 1307 generates the RDY2 signal only if a logic level 0 inverted auxiliary ready (-AUXRDY) signal appears on lead 1307b. This AUXRDY signal is used for maintenance purposes as is the SELRDY signal on lead 1308a which is required to enable the RDY2 signal. An example of a typical use for these signals would be where the auxiliary ready signal is connected to an operators panel and the select ready signal is connected to an instruction step button.

Ready circuit 1300 is shown connected to ready monitor circuit 1310 via the processor ready (PRDY) signal on lead 1309a. Two MHz reference clock circuit 1320 is shown connected to divide by 10 counters 1340 and 1341 via strapping field 1326. Two MHz clock source 1321 is shown connected to flip-flop 1322 whose J & K inputs are ties to a logic level 1 or +5 volt power supply. Thus flip-flop 1322 operates as a toggle flip-flop and divides the 2 MHz clock frequency down to a 1 MHz signal.

Biquinary counters 1323, 1324 and 1325 operate to divide their clock A signal by 2 and their clock B signal by 5. These divided signals appear at the QA and QD outputs respectively. Thus biquinary counter 1323 divides the 1 MHz signal appearing at its clock B input by 5 thereby generating a 200 KHz signal on its QD output. This QD output signal appears at the clock A input and biquinary counter 1323 divides this frequency by 2 and applies it to its QA output. Therefore the signal appearing at the QA output of biquinary counter 1323 has a 100 KHz signal. This signal appears at the clock A input of biquinary counter 1324 which divides it by 2 and thus provides a 50 KHz signal at its QA output. Since this signal appears at the clock B input of biquinary counter 1324, it divides this signal by 5 thereby generating a 10 KHz signal at its QD output. Since this signal appears at the clock B input of biquinary counter 1325 it divides this signal by 5 and generates a 2 KHz signal at its QD output. Since this signal also appears at the clock A input of this counter it divides that signal by 2 thereby generating a 1 KHz signal at its QA output.

Thus 4 different frequencies appear at strapping field 1326, namely a 50 KHz signal, a 10 KHz signal, a 2 KHz signal and a 1 KHz signal. These signals have periods of 0.02 millisecond, a 0.1 millisecond, 0.5 milliseconds and 1 millisecond respectively. Through use of straps in strapping field 1326 any of these four frequencies can be used as a reference frequency for monitor 1310. Typically the period to be selected would be slightly longer than the slowest ready signal to be monitored thereby allowing a properly operating ready signal to reset the monitor before it times out under control of the reference frequency.

Assuming flip-flop 1330 is initially reset, a logic level 1 signal appears on its $\overline{Q}$ output. This logic level 1 signal clears 4-bit counter 1340. However it has no effect on 4-bit counter 1341 since gate 1332 requires logic level 0 inputs to generate a logic level 1 clear signal. Therefore counter 1340 is prevented from counting while counter 1341 is free to count.

Counter 1340 counts the number of clock pulses appearing at its clock input from reference clock 1320. Upon reading a count of 10, gate 1343 decodes this count and generates a logic level 0 signal on lead 1343a. Gate 1344 passes this signal on as a logic level 1 clock signal to D-type flip-flop 1351. Since its D input is tied to 5 volts, it clocks a logic level 1 signal to its Q output when this clock pulse appears. This logic level 1 signal appears at the clock input of D-type flip-flop 1352 whose D input is also tied to plus 5 volts. Therefore the flip-flop generates a logic level 1 ready bus failure signal on lead 1352a.

Two flip-flops, 1351 and 1352, are used since it is desirable that the monitor circuit be cleared and capable of detecting further failures upon detection of a first failure. However it is also desirable that the ready bus failure signal remain stable until the problem is corrected. Therefore, flip-flop 1351 and preceeding circuitry can be cleared upon detection of a stuck-at-1 or stuck-at-0 ready signal. However flip-flop 1352 remains set and continues to apply a ready bus failure signal to lead 1352a until the problem is corrected and the processing unit applies a clear failure signal to lead 1352b.

Since ten of these reference clock pulses must be counted before timing out and setting the ready bus failure signal the relevant time-out periods are 0.2, 1, 5 and 10 milliseconds. Thus the appropriate straps would be applied to select a time-out period slightly longer than the expected time required for a ready signal to appear at the input to gate 1306. Should a ready signal so appear flip-flop 1330 toggles since its J and K inputs are normally at a logic level 1. This results in a logic level 0 signal appearing at the $\overline{Q}$ output of flip-flop 1330. This signal causes gate 1332 to apply a logic level 1 signal to 4-bit counter 1341 thereby clearing it and preventing it from counting and timing out. Simultaneously the logic level 0 $\overline{Q}$ output signal of flip-flp 1330 removes the clear signal from 4-bit counter 1340 thereby allowing it to count the clock pulses from reference clock 1320.

Counter 1340 and decoder 1342 operate in the same manner as counter 1341 and decoder 1343. The only difference is that counter 1340 is cleared by a logic level 1 signal on the $\overline{Q}$ output of flip-flop 1330 and counter 1341 is cleared by logic level 0 signal on the $\overline{Q}$ output of flip-flop 1330. Thus the flip-flop that is not cleared is free to count clock pulses from the reference clock source and generate a ready bus failure signal in response to a decode of ten. However this ready bus failure signal is only generated if the processor ready (PRDY) signal does not appear within the predetermined allowable time.

If the system is operating properly, the processor ready signal appears before the decode of 10 is reached and flip-flop 1330 toggles thereby placing a clear signal on the counter, 1340 or 1341, which was running and preventing generation of the ready bus failure signal.

This arrangement allows for detection of a ready signal which is either stuck at 0 or stuck at 1. For example if the processor ready signal is stuck at 0 and flip-flop 1330 is initially reset counter 1340 will be cleared but counter 1341 will be free to count. This counter will then time-out and cause a ready bus failure (RBFAIL) signal since flip-flop 1330 will only toggle upon appearance of a negative going processor ready signal which will not appear when this signal is stuck at 0.

Similarly, if the processor ready signal is stuck at 1 and flip-flop 1330 is set, a logic level 0 signal will appear at the Q output. This will cause a logic level 1 signal to appear at the clear input of flip-flop 1341 via gate 1332 thereby causing counter 1341 to clear and allowing counter 1340 to count. Counter 1340 will then time-out upon detection of ten of the reference clock pulses and cause the ready bus failure signal to be generated. Again, this failure signal will be generated since a negative going processor ready signal is required to toggle flip-flop 1330 to clear counter 1340 and prevent generation of the ready bus failure signal.

The self check circuit can also routine this circuit by applying a logic level 0 ready-stuck-at-0 (RSA∅) or ready-stuck-at-1 (RSA1) signal to the J or K input, respectively, of flip-flop 1330. These signals will force the corresponding logic level 1 or 0 signals on the $\overline{Q}$ output of flip-flop 1330. Under these conditions flip-flop 1330 cannot toggle to generate a clear signal to the counters so they will time out. For example, if a logic level 0 signal is applied to the J input of flip-flop 1330 it will be held in a reset state with a logic level 1 on its $\overline{Q}$ output thereby holding counter 1340 cleared but allowing counter 1341 to count. In such a situation counter 1341 will time out and generate the ready bus failure signal since flip-flop 1330 is prevented from toggling and therefore can't generate a clear signal before the ready bus failure signal is generated.

Similarly, if a logic level 0 signal is applied to the K input of flip-flop 1330 a logic level 0 signal will appear at its $\overline{Q}$ output thereby holding counter 1341 cleared but allowing counter 1340 to count and time out. Again counter 1340 will time out since flip-flop 1330 is held in the set state and is prevented from generating a clear signal before the ready bus failure signal is generated. Thus the self check circuit has the capability to routining both ranks of counters and the associated circuitry used to generate the ready bus failure signal.

Gate 1344 generates a logic level 1 signal when either counter 1340 or 1341 times out. Under such conditions gate 1344 generates a logic level 1 clock signal which causes D-type flip-flop 1351 to apply a logic level 1 signal to its Q output. Gate 1345 generates a logic level 1 signal in response to this output signal and the absence of routining signals RSA∅ and RSA1. This signal is clocked into D-type flip-flop 1353 when an internal clock pulse (ICLK) appears from the processing unit. The Q output of this flip-flop than has a logic level 1 signal which appears at the input to gate 1355. Since initially gate 1354 is reset, a logic level 1 signal appears at its $\overline{Q}$ output and thus gate 1355 generates a logic level 0 ready timer (-RTMR) signal which clears the monitor circuit via gate 1331. This gate also generates what appears to be a ready signal to gate 1306 to exit the processor from the "WAIT" state and allow further monitoring to continue in the event that the -RDY signal had been stuck-at-1 (not ready condition). On the second clock pulse after the appearance of a logic level 1 signal at the D input of D-type flip-flop 1353, D-type flip-flop 1354 clocks the logic level 1 Q-output of flip-flop 1353 into D-type flip-flop 1354 thereby generating a logic level 0 signal on its $\overline{Q}$ output. This logic level 0 signal causes gate 1355 to remove the ready timer (-RTMR) signal thus presenting a ready timer pulse signal, one clock pulse wide, to gates 1331 and 1306.

Thus, the monitor circuit continues to generate a ready bus failure signal upon its first detection of absence of a ready pulse within the alotted time period even though the timer circuitry is reset after generation of the ready bus failure (RBFAIL) signal. Upon removal of the condition causing the failure of a ready signal, the processing unit applies a clear signal to lead 1352b of flip-flop 1352 thereby removing the ready bus failure (RBFAIL) from signal the external system.

The self check circuit can also clear both ranks of flip-flops via a logic level 0 signal on lead 1331a. Gate 1331 then applies a logic level 0 signal gate 1332 which applies the logic level 1 clear signal to counter 1341. Gate 1331 also applies a logic level 0 clear signal to flip-flop 1330 which then applies the logic level 1 clear signal to counter 1340. This circuit can also be cleared by the external system by appling a logic level 0 fail safe inhibit (FSIHB) signal on lead 1331b. This signal would typically be used during maintenance procedures when the system is not arranged to provide the required ready signals. This FSIHB signal inhibits the ready monitor from providing failure signals due to an absence of ready signals and thus renders the master-slave microprocessor control circuit safe from ready failures.

Thus the present invention is a novel master-slave microprocessor control circuit. This circuit includes a novel arrangement of microprocessors, memories, interrupt control, self check, comparison and bus transceivers. Further novel features include a hold or microprocessor interrupt control circuit and pulse monitor circuits.

It will be obvious to those skilled in the art that numerous modifications of the present invention can be made without departing from the spirit of the invention which shall be limited only by the scope of the claims appended hereto.

What is claimed is:

1. A processor control circuit for use in a telephone switching system, said telephone switching system being operative to provide external address data and control signals and an interrupt signal, said processor control circuit comprising:

first processing means operated to generate a first group of internal address, data and control signals;

second processing means operated in sychronism with said first processing means to generate a second group of internal address, data and control signals; and comparison means connected to said first and second processing means, operated in response to miscomparison between said first and second groups of internal address, data and control signals to generate a processor failure signal;

said first and second processing means operated in a master-slave arrangement, wherein only said first group of internal address, data control signals is applied to said telephone switching system, and wherein said first and second processing means are both operated to receive said external address, data and control signals;

whereby said second processing means is operated as a receive-only processing means with respect to said telephone switching system;

a master bus transceiver connected to said first processing means;

a slave bus transceiver connected to said second processing means;

a system data bus connected to said master and slave bus transceivers;

said master bus transceiver operated in response to a first predetermined pattern of said first group of internal address and control signals to transfer said first group of internal data signals to said system data bus;

a local bus transceiver connected to said system data bus and said first processing means; and an input-output device connected to said local bus transceiver and said first processing means;

said local bus transceiver operated in response to a second predetermined pattern of said first group of internal address and control signals to transfer data from said system data bus to said local bus transceiver;

said input-output device operated in response to a third predetermined pattern of said first group of internal address and control signals to transfer data from said local bus transceiver to said input-output device;

said input-output device further operated in response to a fourth predetermined pattern of said first group of internal address and control signals to transfer data to said local bus transceiver;

said local bus transceiver operated in response to a fifth predetermined pattern of said first group of internal address and control signals to transfer data from said input-output device to said system data bus;

said master bus transceiver operated in response to a sixth predetermined pattern of said first group of internal address and control signals to transfer data from said system data bus to said first processing means;

said slave bus transceiver operated in response to a first predetermined pattern of said second group of internal address and control signals to transfer data from said system data bus to said second processing means;

said input-output device comprising:
a programmable interrupt controller connected to said telephone switching system and said first processing means, operated in response to said data from said local bus transceiver to arrange an interrupt recognition sequence; said programmable interrupt controller further operated in response to said interrupt signal to generate an interrupt received signal; said first processing unit further operated in response to said interrupt received signal to generate an interrupt acknowledge signal; said programmable interrupt controller further operated in response to said interrupt acknowledge signal and said fourth pattern of said first group of internal address and control signals to transfer interrupt identification data to said local bus transceiver.

2. A processor control circuit as claimed in claim 1, wherein: said comparison means comprises an address comparator operated in response to miscomparisons between said first and second groups of address signals to generate an address failure signal.

3. A processor control circuit as claimed in claim 1, wherein: said comparison means further comprises a data comparator operated in response to miscomparisons between said first and second data signals to generate a data failure signal.

4. A processor control circuit as claimed in claim 1, wherein: said comparison means further comprises a control signal comparator operated in response to miscomparisons between said first and second groups of control signals to generate a control failure signal.

5. A processor control circuit as claimed in claim 1, wherein there is further included: address parity means connected to said first processing means, operated in response to even parity across said first group of internal address signals to generate an address parity failure signal.

6. A processor control circuit as claimed in claim 1, wherein there is further included: data parity means connected to said first processing means operated in response to even parity across said first group of data signals to generate a data parity failure signal.

7. A processor control circuit as claimed in claim 1, wherein said telephone switching system is operated to generate a clock signal, said processor control circuit further comprising: clock monitor means operated in response to an absence of said clock signal for a predetermined time to generate a clock failure signal.

8. A processor control circuit as claimed in claim 1, wherein said telephone switching system is operated to generate a ready signal, said control circuit further comprising: ready signal monitor means operated in response to an absence of said ready signal for a predetermined time to generate a ready failure signal.

9. A processor control circuit as claimed in claim 2, wherein there is further included: self check means operated in response to a predetermined pattern of said first group of address, data and control signals to generate an address comparator routining signal; said address comparator further operated in response to said address comparator routining signal to generate said address failure signal; said self check means further operated in response to said predetermined pattern and an absence of said address failure signal to generate a self check failure signal.

10. A processor control circuit as claimed in claim 3, wherein there is further included: self check means operated in response to a predetermined pattern of said first group of address, data and control signals to generate a data comparator routining signal; said data comparator further operated in response to said data comparator routining signal to generate said data failure signal; said self check means further operated in response to said predetermined pattern and an absence of said data failure signal to generate a self check failure signal.

11. A processor control circuit as claimed in claim 4, wherein there is further included: self check means operated in response to a predetermined pattern of said first group of address, data and control signals to generate a control signal routining signal; said control signal comparator further operated in response to said control signal routining signal to generate said control failure signal; said self check means further operated in response to said predetermined pattern and an absence of said control failure signal to generate a self check failure signal.

12. A processor control circuit as claimed in claim 5, wherein there is further included: self check means operated in response to a predetermined pattern of said first group of address, data and control signals to generate an address parity routining signal; said address parity means further operated in response to said address parity routining signal to generate said address parity failure signal; said self check means further operated in response to said predetermined pattern and an absence of said address parity failure signal to generate a self check failure signal.

13. A processor control circuit as claimed in claim 6, wherein there is further included: self check means operated in response to a predetermined pattern of said first group of address, data and control signals to generate a data parity routining signal; said data parity means further operated in response to said data parity routining signal to generate said data parity failure signal; said self check means further operated in response to said predetermined pattern and an absence of said data parity failure signal to generate a self check failure signal.

14. A processor control circuit as claimed in claim 7, wherein there is further included: self check means operated in response to a predetermined pattern of said first group of address, data and control signals to generate a clock monitor routining signal; said clock monitor means further operated in response to said clock monitor routining signal to generate said clock failure signal; said self check means further operated in response to said predetermined pattern and an absence of said clock failure signal to generate a self check failure signal.

15. A processor control circuit as claimed in claim 8, wherein there is further included: self check means operated in response to a predetermined pattern of said first group of address, data and control signals to generate a ready monitor routining signal; said ready signal monitor means further operated in response to said ready monitor routining signal to generate said ready failure signal; said self check means further operated in response to said predetermined pattern and an absence of said ready failure signal to generate a self check failure signal.

* * * * *